J. M. PAGE.
VEHICLE WHEEL.
APPLICATION FILED JULY 20, 1908.
925,498.
Patented June 22, 1909.
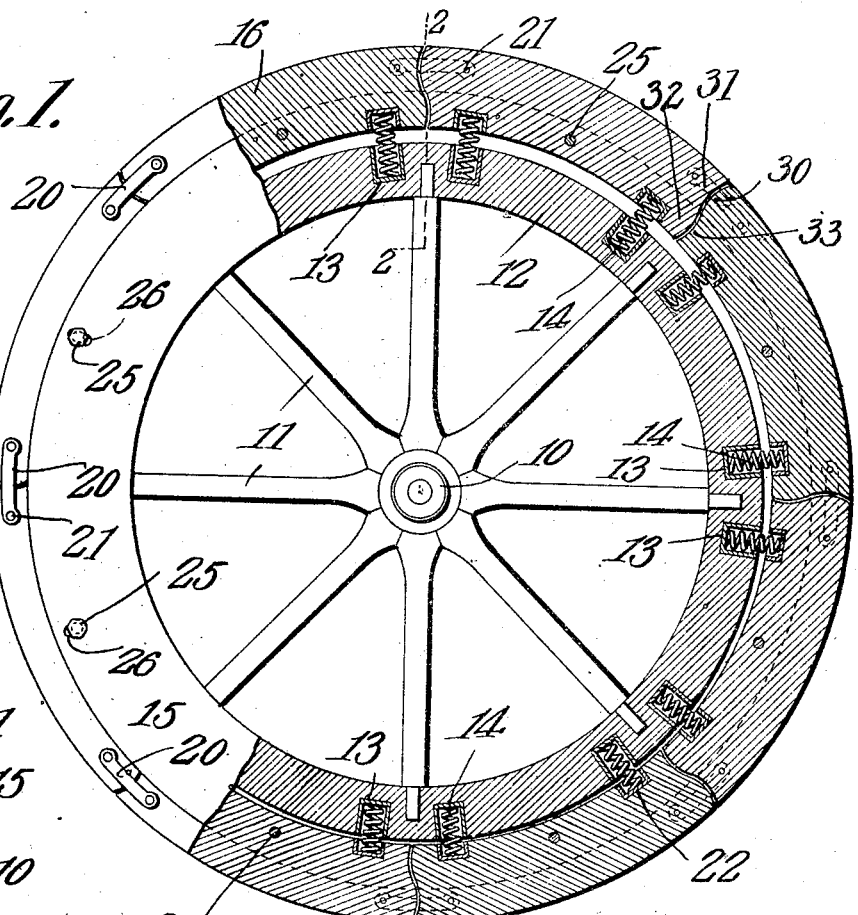
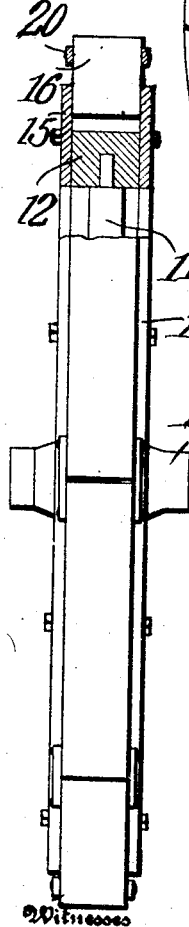
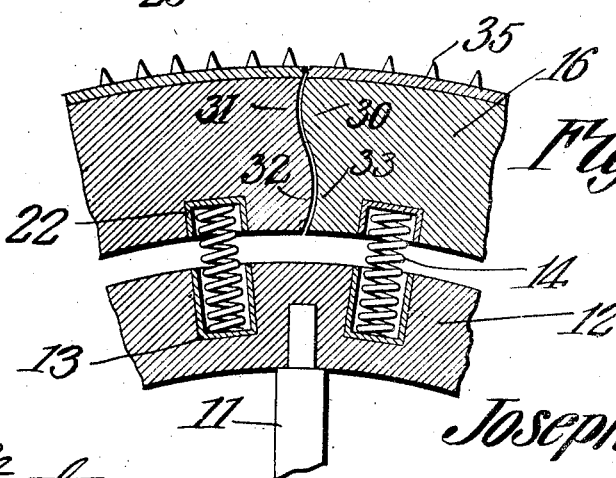
Inventor,
Joseph M. Page.

UNITED STATES PATENT OFFICE.

JOSEPH M. PAGE, OF STOCKTON, CALIFORNIA.

VEHICLE-WHEEL.

No. 925,498.  Specification of Letters Patent.  Patented June 22, 1909.

Application filed July 20, 1908. Serial No. 444,393.

*To all whom it may concern:*

Be it known that I, JOSEPH M. PAGE, a citizen of the United States, residing at Stockton, in the county of San Joaquin and State of California, have invented a new and useful Vehicle-Wheel, of which the following is a specification.

This invention relates to wheels for use in automobiles, carriages, and other vehicles, and has for its principal object to provide a novel form of wheel tire or felly in which wood or other relatively non-yieldable substance may be employed as a substitute for the ordinary cushion or pneumatic tire.

A further object of the invention is to provide a wheel tire or felly that is formed of a series of independently movable sections so connected together as to permit independent movement, the connecting joints being so arranged as to prevent the entrance of dust or dirt between them.

With these and other objects in view, as will more fully hereinafter appear, the invention consists in certain novel features of construction and arrangement of parts, hereinafter fully described, illustrated in the accompanying drawings, and particularly pointed out in the appended claim, it being understood that various changes in the form, proportions, size and minor details of the structure may be made without departing from the spirit or sacrificing any of the advantages of the invention.

In the accompanying drawings:—Figure 1 is a sectional elevation of a wheel constructed in accordance with the invention. Fig. 2 is a front view of a complete wheel constructed in accordance with my invention, the upper portion thereof being shown in section on the line 2—2 of Fig. 1. Fig. 3 is a detail view of a modification.

Similar numerals of reference are employed to indicate corresponding parts throughout the several figures of the drawings.

The body of the wheel comprises a central hub 10, a plurality of spokes 11, and an outer circular rim 12, to which the outer ends of the spokes are rigidly secured. The rim may be formed of any suitable material, and is provided at intervals with peripherally disposed recesses in which are fitted metallic cups 13 for the reception of the inner ends of helical compression springs 14.

To the opposite sides of the rim are bolted metallic rings 15 that preferably are formed of thin sheet steel or similar material, the peripheral portions of these rings extending some distance beyond the periphery of the rim 12, thus forming a continuous groove for the reception of a tire that is formed of a series of independently movable sections 16 connected by links 20. Each of the sections is of approximately the same width as the ring 12, and each end of each section is reversely curved, the parts interfitting in such manner as to permit relatively free movement of the sections. This reverse curvature causes a head 30 to be formed in the end of one section at the periphery of the tire, adapted to register in a socket 31 in the other section; and a head 32 to be formed in the latter section, at the inner edge of the tire, adapted to register in a socket 33 in the former section. The head 30 and the socket 31, across which the links 20 extend, form a pivotal union between the tire sections, and the head 32 and the socket 33 co-act under the outward, radial thrust of the springs 14, to maintain the alinement of the sections to limit the pivotal movement of the sections under the action of the springs, and to distribute the strain on the ends of the sections. The reverse curvature of the ends of the tire sections, so fashions the heads 30 and 32, that the same are not likely to be sheared or broken, under the yielding of the tire.

The tire sections are preferably formed of hard wood or other material which will resist wear and the various sections are coupled in a continuous annular series by means of links 20, the opposite ends of which are pivoted on bolts 21 that extend through the tire sections and project slightly beyond the opposite sides thereof.

The inner faces of the tire sections are provided with sockets for the reception of metallic cups 22 which are located in radial alinement with the similar cups 13 of the rim and between each pair of cups are arranged the springs 14, there being preferably two or more springs for each tire section, and when the parts are in place the tire sections will be spread and held outward to the fullest limit by means of said springs.

In order to prevent circumferential creeping of the tire each of the tire sections is provided with an opening for the passage of a bolt 25 which extends through radial slots 26 in the side rings. This, however, will not interfere with the limited radial movement of the tire sections, while in case of breakage of the link connection the bolts would prevent the tire sections falling from position.

In operation, the weight of the automobile or other vehicle is imposed through the axle and hub and being transmitted to the rim, the springs which successively arrive at a point below and in the vertical plane of the hub will be compressed, so that the inner faces of the tire sections will approach the periphery of the rim to an extent dependent on the load.

Under ordinary circumstances the connecting joints between the various sections of the tire will hold the tire in annular form, but when traveling over rough roads the sections may yield independently in case obstructions are encountered.

Where the wheel is to be used on ice, small strips of metal may be applied to the periphery of the tire sections, these strips carrying small spurs or teeth 35, as indicated in Fig. 3.

In the following claim I have used the phrase "socket and head at the inner edge of the tire"; and as the said phrase, unaccompanied by proper explanation, might fail to disclose the novel elements of my invention with proper exactness, I will state that I refer thereby to the head 32 and the socket 33.

What is claimed is:—

In a wheel, a tire composed of a plurality of sections, the abutting faces of the sections being reversely curved, transversely of the tire, to form, at the periphery of the tire, a head in the end of one section, and a socket in the end of the other section, and to form, at the inner edge of the tire, a socket in the end of the former section, and a head in the end of the latter section; a link extending across the head and socket at the periphery of the tire, to form a pivotal connection between the sections; a wheel disposed within the tire; continuous rings disposed upon opposite sides of the rim of the wheel to form a tire-receiving groove; and compression springs disposed between the rim and the tire; the socket and head at the inner edge of the tire being arranged to register, to limit the pivotal movement of the sections under the action of the springs.

In testimony that I claim the foregoing as my own, I have hereto affixed my signature in the presence of two witnesses.

JOSEPH M. PAGE.

Witnesses:
   CHARLES W. COMSTOCK,
   EDWARD D. TAYLOR.